Aug. 4, 1931.  J. J. N. VAN HAMERSVELD  1,817,723
INDICATOR
Filed Nov. 23, 1929   5 Sheets-Sheet 1
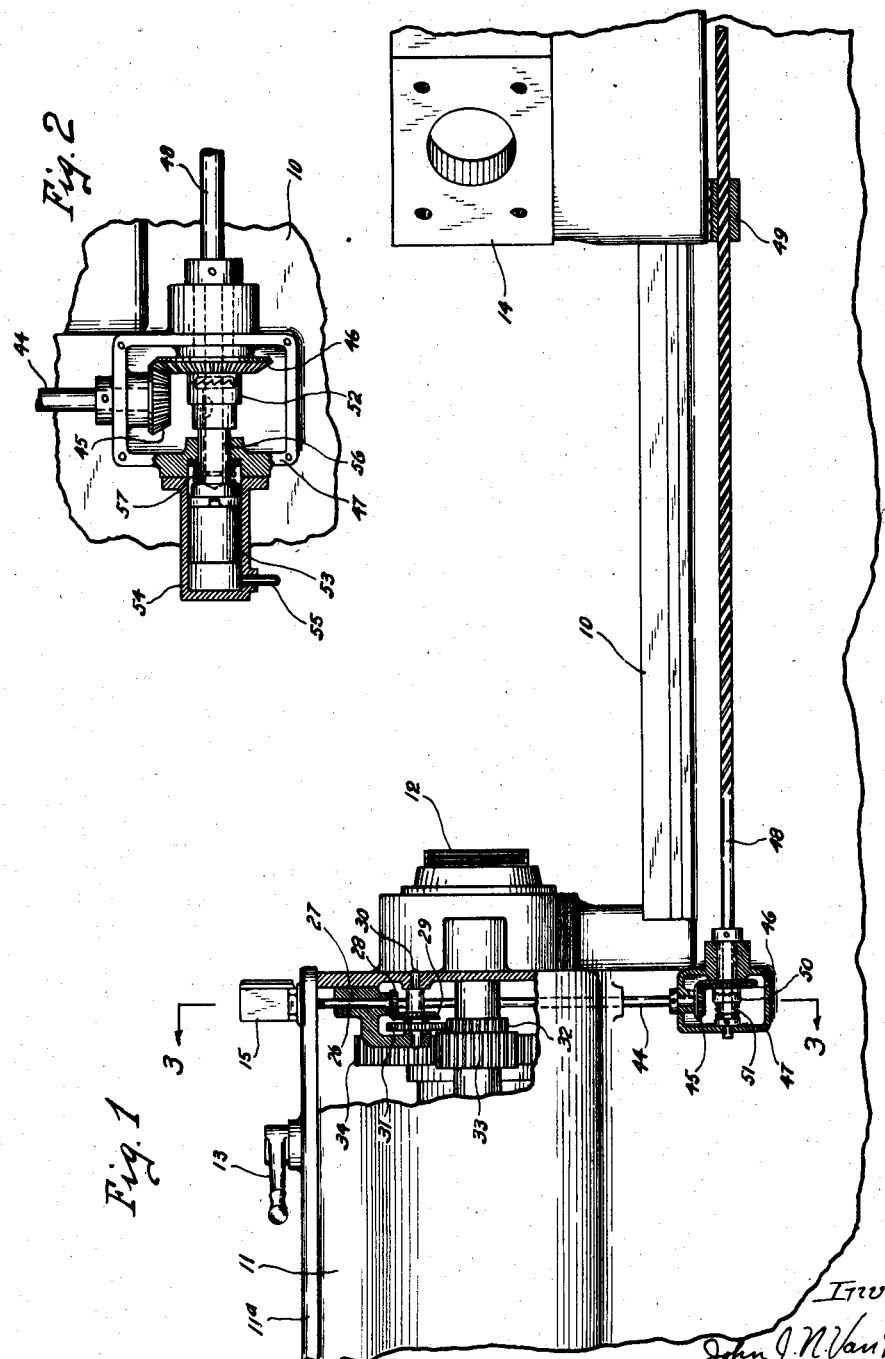

Aug. 4, 1931.            J. J. N. VAN HAMERSVELD            1,817,723
                                  INDICATOR
                      Filed Nov. 23, 1929        5 Sheets-Sheet 2
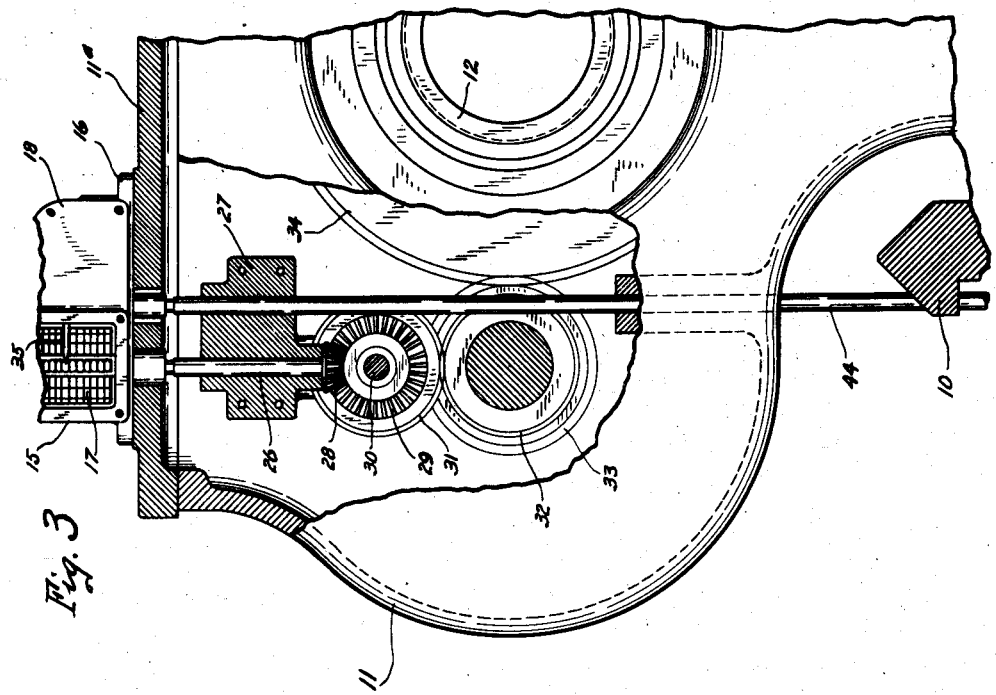
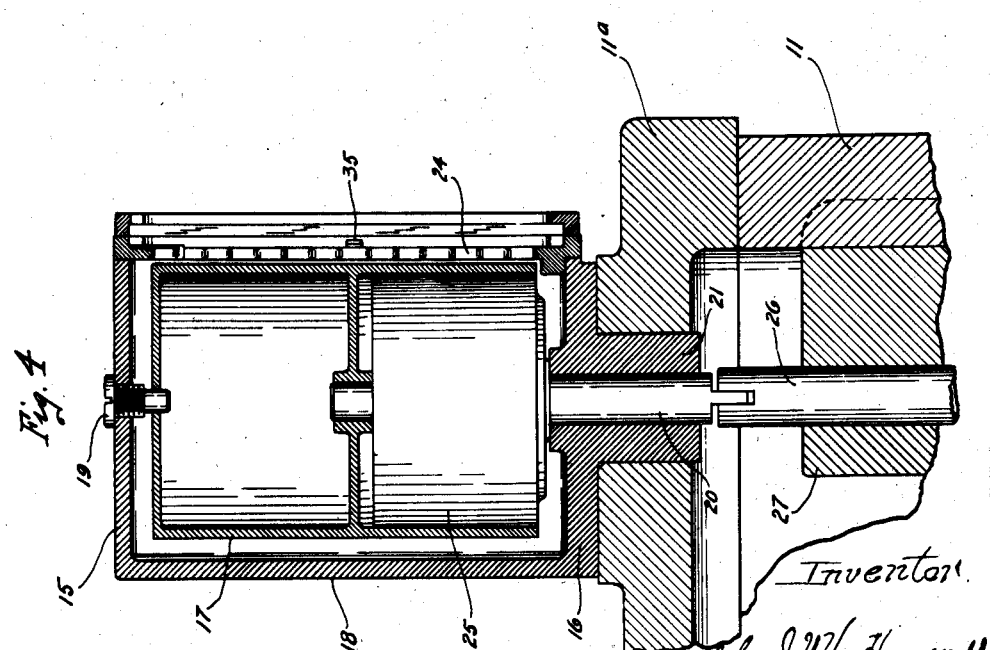
Inventor.
John J. Van Hamersveld
Knight Hudson & Kent
attys.

Aug. 4, 1931.  J. J. N. VAN HAMERSVELD  1,817,723
INDICATOR
Filed Nov. 23, 1929   5 Sheets-Sheet 4
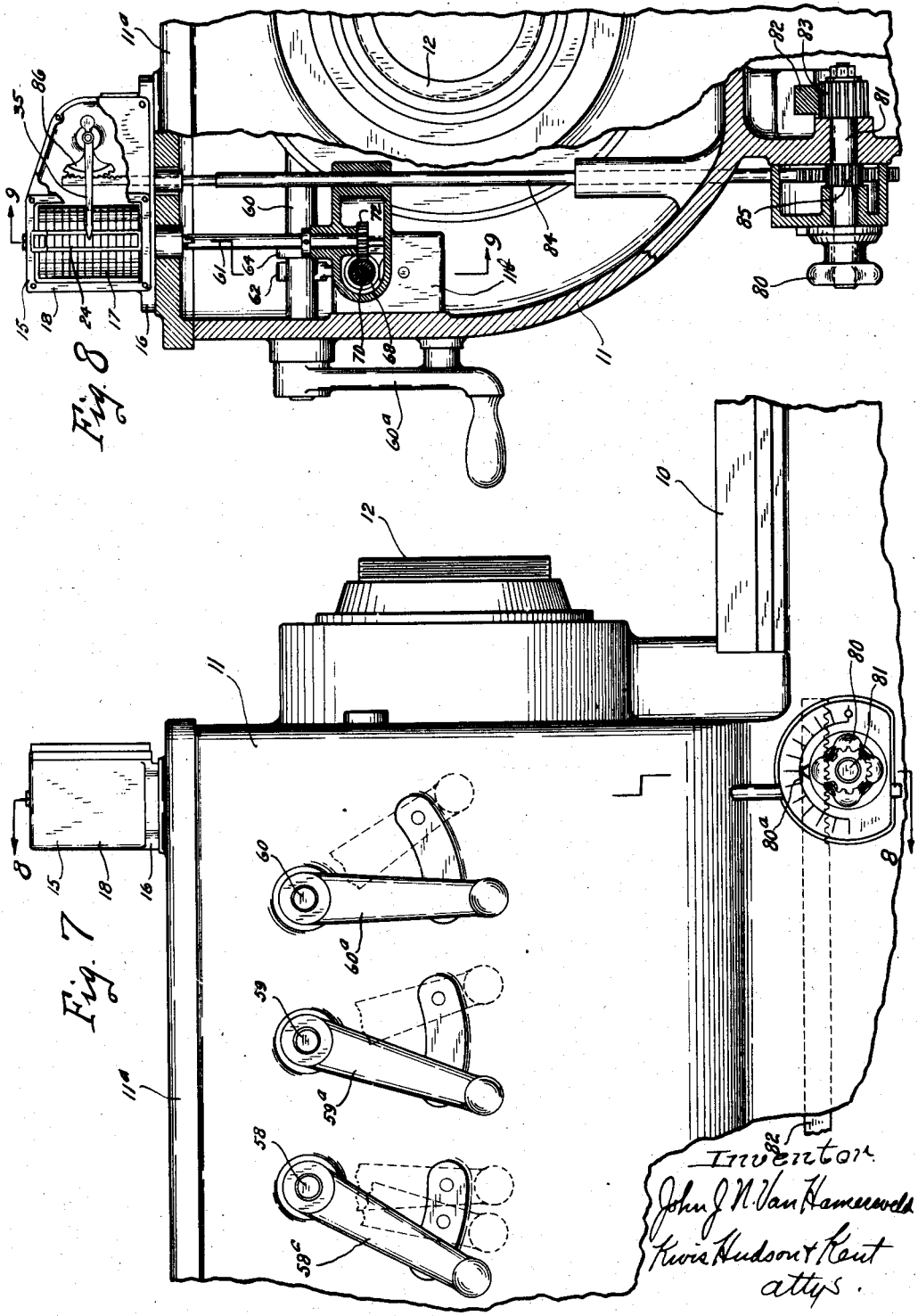

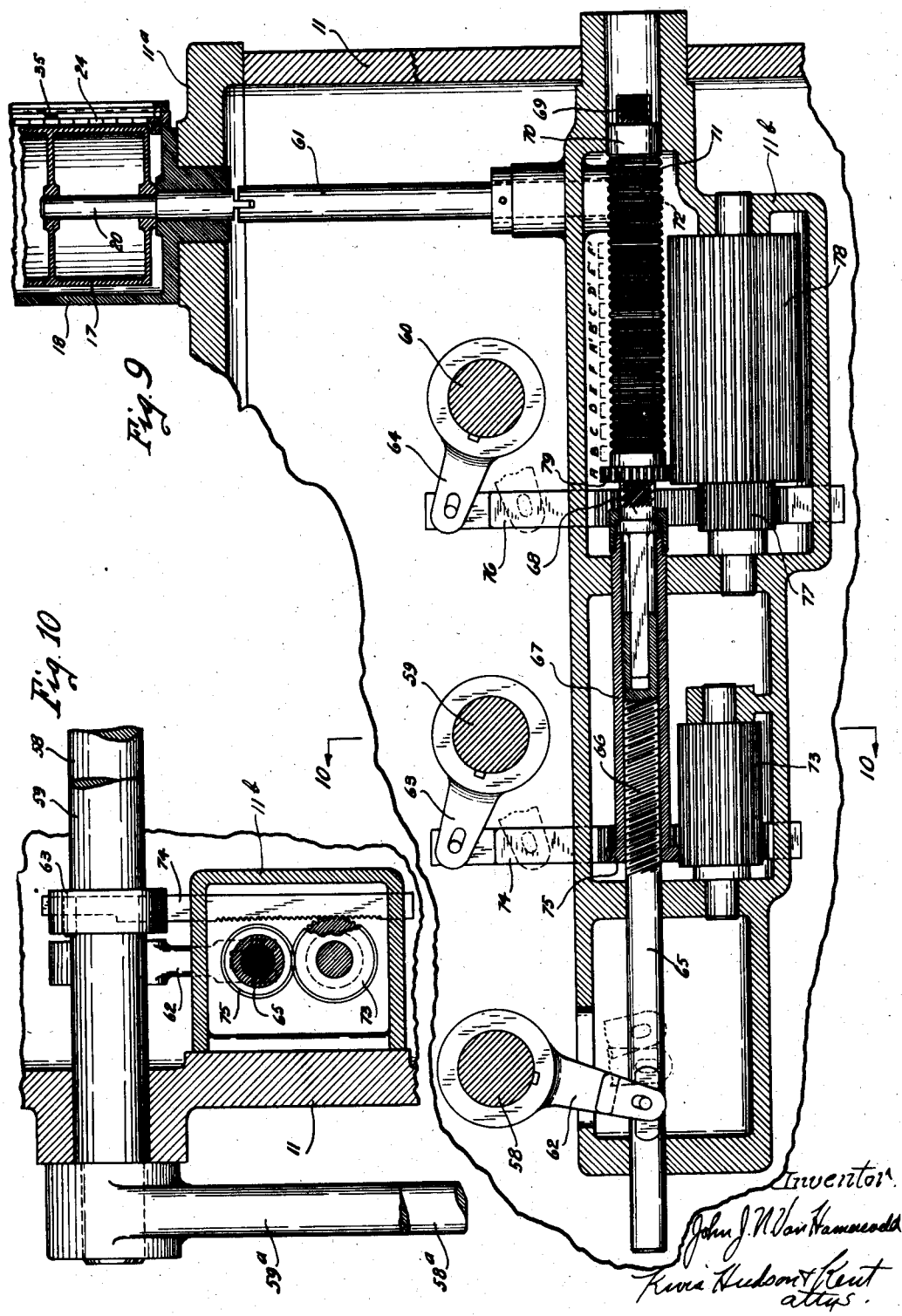

Patented Aug. 4, 1931

1,817,723

UNITED STATES PATENT OFFICE

JOHN J. N. VAN HAMERSVELD, OF CLEVELAND HEIGHTS, OHIO, ASSIGNOR TO THE WARNER & SWASEY COMPANY, OF CLEVELAND, OHIO, A CORPORATION OF OHIO

INDICATOR

Application filed November 23, 1929. Serial No. 409,411.

This invention relates to an indicator for indicating the rate of movement of a member and has particular reference to an indicator for indicating the rate of movement of such a member with reference to the rate of movement of another member, as, for example, for indicating the rate of movement of a reciprocating part or slide, such as the slide of a lathe or other machine tool, with reference to the rate of rotation of a shaft, such as the work spindle of the machine tool.

An indicator, when adapted for this general purpose, finds great utility in indicating the rate of feed of a tool slide with reference to the rate of rotation or the revolutions per minute of the work spindle, particularly when the slide and spindle are operated by means more or less independent of each other, as, for example, by separate motive means and not by unitary power means wherein the slide is required to move in fixed relation to the movement of the spindle.

An indicator which accomplishes the above in a very satisfactory way constitutes the subject matter of the present invention which may be here briefly summarized as consisting in certain novel details of construction and combinations and arrangements of parts which will be described in the specification and set forth in the appended claims.

In the accompanying sheets of drawings, I have shown two different embodiments of the invention, and I have illustrated the latter in connection with the slide and spindle of a lathe, but it is to be understood that the invention is by no means confined to this particular field, but is adaptable for use in other relationships or in association with other machines and devices having one or more parts whose rate of movement is to be indicated.

Figure 5:
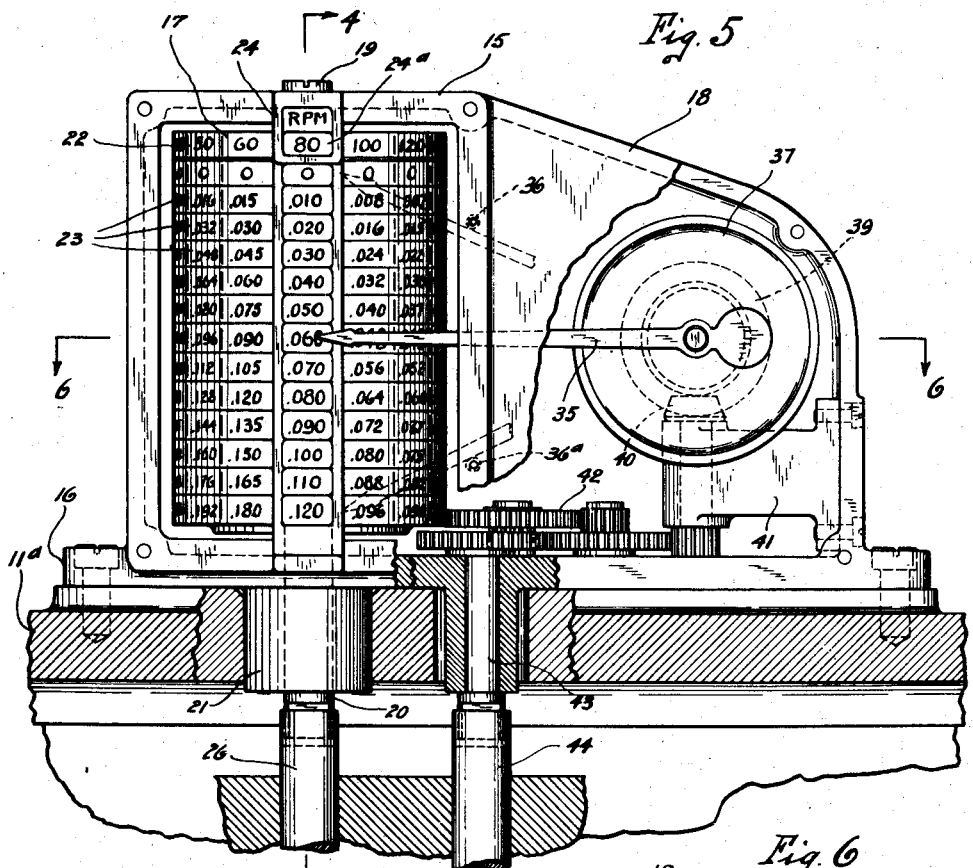
Figure 6:
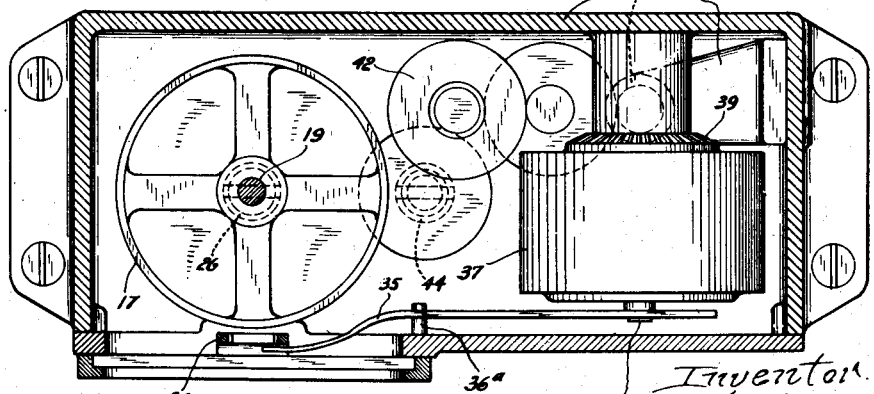

In the drawings, Fig. 1 is a side elevation, partly in section, of a portion of a lathe showing one way of carrying out the invention; Fig. 2 is a detail view on an enlarged scale, showing a modification in the actuating mechanism illustrated in Fig. 1; Fig. 3 is a view partly in elevation, looking toward the work end of the spindle, and partly in section, substantially along the line 3—3 of Fig. 1, the parts being shown on an enlarged scale; Fig. 4 is a transverse sectional view on a still larger scale, substantially along the line 4—4 of Fig. 5; Fig. 5 is a view partly in elevation and partly in section, showing particularly the instrument or indicator proper, viewing the same from the front and showing it mounted on its support which, in this instance, is the head of the lathe; Fig. 6 is a horizontal sectional view substantially along the line 6—6 of Fig. 5; Figs. 7 and 8 are views corresponding to Figs. 1 and 3 respectively, showing a slightly different type of head and a different form of mechanism for operating the indicator; Fig. 9 is a sectional view on an enlarged scale, substantially along the line 9—9 of Fig. 8; and Fig. 10 is a sectional view substantially along the line 10—10 of Fig. 9.

Inasmuch as the invention is very useful, as stated above, in indicating the rate of movement of the slide of a lathe in relation to the rotation of the work spindle, I have illustrated and will describe this particular application of my invention, and to make clear its greatest utility when so applied, I might state that in the major portion of the lathes as heretofore constructed the slide is operated mechanically from the spindle rotating mechanism. The slide, therefore, during its feeding movement, i. e., when the tool is in cutting relation with the work, has a definite or fixed movement in relation to the rotation of the spindle so that the slide will move a certain fraction of an inch for each revolution of the spindle, this rate of movement in relation to the rotation of the spindle being changed only by changing the ratio of the movement transmitting gearing. There are also other types of lathes wherein the slide is not operated mechanically from the spindle rotating means but both the spindle and the slide are operated by more or less independent motive means such, for example, as a motor for operating the spindle through variable speed gearing and a hydraulically operated piston or cylinder for operating the slide. In such cases there is no invariable relationship between the movement of the slide and the rotation of the spindle because of leakage or other factors, such, for example, as the temperature and the fluidity of the actuating fluid. With machines of the type last referred to, wherein the intended or theoretical rate of movement of the slide is dependent upon the rate of flow of the actuating fluid, my invention has especial utility for the operator is enabled to determine the actual rate of movement of the slide per revolution of the spindle, the indicator being so constructed and operated that changes in both indicating factors, i. e., a change in the rate of rotation of the spindle and a change in the rate of movement of the slide, regardless of what these changes may be, are both taken care of on the indicator.

The indicator has two movable members, one assuming a position dependent upon the rate of rotation of the spindle and the other taking a position dependent upon the rate of movement of the slide, the two movable indicating members enabling an instant reading to be obtained of the rate of movement of the slide at any time with reference to the rate of rotation of the spindle, regardless of the particular ratios of the gearing utilized in rotating the spindle as determined by the positions of the control mechanism usually in the form of a series of control levers and regardless of the particular mechanism employed for actuating the slide.

Further, it may be stated, preliminarily to a description of the indicator itself and the actuating means therefor, that my invention contemplates different ways of actuating either or both of the two movable members of the indicator. For example, each member of the indicator may be moved to a position determined by the rate of movement of the slide or spindle by any of the usual forms of tachometers, or one or both of the members of the indicator may be actuated by the mechanism which controls the rate of movement of such member or members. For example, the movable member of the indicator which assumes a position dependent upon the rate of movement of the spindle may be operated through the medium of a tachometer whose rotating element is suitably connected to the spindle or to one of the rotating members which rotates it, or it may be moved by actuating means associated with the spindle speed control mechanism, as, for example, the series of levers previously mentioned. The same is true also of the indicating member which assumes a position dependent upon the rate of movement of the slide. Both forms of actuating means have their advantages, and both, as before stated, are contemplated by and constitute a part of the present invention in some of its phases.

Referring now to the drawings, 10 represents the bed of a lathe on which is a head 11 which, as usual carries a work spindle the forward end of which is indicated at 12 and also the gearing and shafts by which this spindle is started and stopped and rotated at various speeds both forward and reverse. Additionally, the head may be provided with a series of levers, one of which is indicated at 13 in Fig. 1 for controlling the starting and stopping, the direction of movement, and the rate of rotation of the spindle, and others illustrated in Figs. 7 and 8.

The bed may have any number of slides, one of which is here indicated in Fig. 1 as a turret slide 14 which, as usual in machines of this character, moves back and forth on the ways of the bed toward and from the work supported by the work spindle 12. Generally the slide is actuated so that it will have a quick return and also a quick forward movement up to nearly the point where the tool begins its cutting operation and then a relatively slow movement which is termed the feed. The rate of movement, i. e., the relatively slow feeding movement and the relatively fast movement just referred to, may be controlled either manually or automatically by controlling the speed ratio of the gearing utilized in actuating the slide in the event that it is mechanically operated, or by valves which vary the rate of flow of the actuating fluid when the slide is hydraulically operated.

The indicator, which is designated as a whole by the reference character 15, is preferably mounted on the head 11 so that the indications may be directly read by the operator when standing in front of the machine. In this instance the front face of the indicator is toward the slide. It is not essential, however, that the indicator be mounted on the head or on the particular part of the head shown, as it may be built into the head if desired and may be positioned so that it can be viewed from the side or front, as convenience of observation would dictate, or it may be mounted on the slide or upon some other part of the machine, or may be otherwise supported.

In this instance, the indicator comprises a base 16 which is bolted and otherwise positioned on the cover plate 11ª of the head. The two indicating elements of the indicator include in this case a drum 17 mounted to turn about a vertical axis in the housing 18 of the indicator, which housing forms a part of the base 16. In this instance, the top of the drum is positioned by a stud 19 and the lower part of the drum is carried by a shaft 20 which, with the form of the invention shown in Figs. 1 to 6, is a tachometer shaft journaled in a boss 21 which extends down from the base 16 into the cover plate 11ª of the head and has a close fit therein for locating purposes. However, these details are not at all material to the invention and may be modified as desired. As a matter of fact, it is not even essential that the indicating member 17 be in the form of a rotary drum for it may be formed and mounted otherwise. For example, it may be in the form of either a flat or arcuate strip, and, if in the form of a flat strip, it may be given an endwise movement instead of a rotary movement, and if given a rotary movement the latter need not be about a vertical axis. This movable indicating member 17, which will be referred to as the drum, only for convenience of description, is provided with two kinds of indicia, one kind being in the form of numerals 22 arranged in a horizontal row, in this instance at the top of the drum, and adapted to indicate the rate of movement of the spindle, preferably in revolutions per minute. The other indicia characters are in the form of numerals 23 arranged in horizontal and vertical rows beneath the characters 22 and adapted to indicate the rate of movement of the slide 14, preferably in terms of fractions of an inch, here indicated in thousandths of an inch, for each revolution of the spindle. The characters 23 preferably have reference to the rate of feed of the slide per revolution of the spindle, the high speed return and high speed forward movement referred to or, rather, its rate of movement when moving at the relatively high speed during the idle portions of its movement being relatively unimportant since no cutting operation is being performed at such times.

In this instance I have shown directly in front of the drum a window strip 24 at the top of which, in line with the row of indicia characters 22, is a window 24ª through which the operator will observe the rate of rotation of the spindle determined by the position of the lever or levers which control the speed change gearing utilized in driving the spindle. Below the window 24ª is a vertical space through which may be observed the vertical rows of indicia 23 and the particular rate of movement of the slide by means of the other movable indicating member to be referred to presently. In Fig. 5, the drum 17 is in a position such that the numeral 80, representing 80 R. P. M., is behind the window 24ª, this meaning, of course, that the spindle is being rotated at the rate of eighty revolutions per minute. As the speed of the spindle is changed by shifting the control lever or levers, the drum will assume other positions so that the correct speed of revolution can be observed through the upper window. The number of indicia characters 22, and, therefore, the number of vertical rows of characters 23, will, of course, depend upon the design of the machine or upon the number of speeds provided for the spindle through the means of the control levers and multiple speed gearing. For example, if the spindle has twelve speeds, there will be twelve of the speed indicating characters 22, each preferably in a separate space, and there will be a corresponding number of vertical rows of characters 23. When the spindle is not rotating, the drum will be in a position to show that fact.

In the construction illustrated in Figs. 1 to 6, the drum is turned through the medium of a tachometer, the rotatable member of which is suitably connected to the spindle or a part which rotates when the spindle is rotated. In this instance, the details of the tachometer mechanism are not shown, the whole being encased in a compartment indicated at 25 (see Fig. 4) and having an operating shaft 20 (previously mentioned) which can be rotated by a flexible shaft or any other means desired, the preferred way being a direct drive through shafts and gearing. As shown, the shaft 20 is coupled to and driven by a short vertical shaft 26 which is supported in a bracket 27 (see particularly Figs. 1 and 3) secured on the inner side of the front wall of the head. This shaft is driven by gearing including a bevel pinion 28 (Fig. 3) secured to the lower end of shaft 26, this in turn being driven by a bevel gear 29 on a short horizontal shaft 30 carrying a spur gear 31 (Fig. 1) engaging a spur gear 32 which rotates with a gear 33 forming one of the spindle driving gears, the gear 33 engaging and rotating a larger gear 34 which is on the work spindle.

As before stated, any suitable tachometer mechanism may be employed in the compartment or housing 25, such, for example, as the usual governor operated or magnetically operated mechanisms. This mechanism of whatever type may be employed includes an inner member which rotates at the speed of shaft 20 and which, in turn, causes the proper rotation to be imparted to an outer member which, in this instance, is attached direct to the drum 17.

The other movable indicating member which cooperates with the movable drum 17 is, in this instance, in the form of a needle or pointer 35, this pointer being adapted to move and to assume the positions between the stops indicated at 36 and 36ª (Fig. 5) in accordance with the rate of feed movement of the slide between zero and no movement and its maximum rate of movement permitted by the design of the machine, the end of the pointer being adapted to swing along the window strip 24, as indicated in Fig. 5. The pointer swings about an axis which is the axis of rotation of a tachometer mechanism within a housing or compartment indicated at 37. The pointer 35 is mounted on the actuated element 38 of the tachometer mechanism while the driving element of the tachometer is rotated in accordance with the rate of movement of the slide by any suitable mechanism, preferably a fixed drive composed of gears and shafting. In this instance the actuating element of the tachometer is rotated by a bevel gear 39 (Figs. 5 and 6) which is rotated by a bevel pinion 40 on a short shaft carried by a bracket 41 within the housing 18. This shaft is driven at a suitable rate of speed by a train of gears 42 constituting step-up gearing, the initial gear of this train being on a short shaft 43 extending through the base 16 of the indicator and being in this instance coupled to a shaft 44 (Figs. 1, 3 and 5) which extends down through the head and through the lower wall thereof, its lower end being provided in this instance with a bevel pinion 45 engaging a bevel gear 46 having an extended hub mounted within a housing 47 secured to the bed of the lathe, this housing not only supporting the gear 46 but also the lower end of the shaft 44. The gear 46 is adapted to be clutched to a shaft 48 which extends back along the bed underneath one of the ways thereof. This shaft has a steep thread, and it engages that equivalent of a nut 49 which is fixed to the slide 14. Obviously, when the slide moves back and forth, the nut will cause the shaft 48 to turn.

In order that the high speed idle return movement of the slide may not be indicated on the indicator, the gear 46 is not fixed to shaft 48, and I provide a clutch formed in part on the hub of gear 46 and in part by a movable clutch member 50 which surrounds the end portion of shaft 48 and is normally pressed into engagement with the clutch teeth formed on the hub of the gear by a light spring 51. When the shaft 48 is turned by the forward movement of the slide, the clutch is engaged and this movement is transmitted to the indicator pointer 35, but when it is turned in the reverse direction on the return movement of the slide, the clutch is disengaged and no movement will be imparted to the tachometer, the light spring then yielding and permitting the clutch to slip. By this mechanism the pointer 35 will assume a position in accordance with the rate of forward movement of the slide, and when the spindle is rotating so that the drum has assumed a position depending upon the rotation of the spindle, the position of the pointer during such forward movement of the slide will assume a position which will directly indicate the movement of the slide per revolution of the spindle in thousandth parts of an inch.

In this instance, the tachometer actuating mechanism will be operated through the entire forward movement of the slide which may or may not include an idle high speed forward movement up to substantially the point where the tool is to begin its cutting operation. In the event that the slide is given a quick forward motion and then a relatively slow feeding movement, the effect on the pointer 35 will be to move it first against the stop 36ª, and as soon as the feed movement of the slide is initiated, the needle will then swing to its proper indicating position to indicate the feeding movement per revolution of the spindle. In the modification shown in Fig. 2, I have provided, for use in connection with a hydraulically operated slide, a simple device by which the gear 46 is automatically unclutched from the shaft 48 except when the feed movement of the slide is taking place. In this instance the movable clutch member, here designated 52, is adapted to be moved into engagement with the clutch teeth formed on the gear 46 by a piston 53 slidable in a cylinder 54 to which is connected a pipe 55 for supplying fluid to the rear side of the piston. A projection carried by the piston engages the rear end of a sleeve 56 which carries a clutch member 52 so that, when the piston is moved forwardly by fluid pressure, the clutch will be engaged, and when the pressure is released, a spring 57 disengages the clutch and moves the piston backward. The pipe 55 is, with this form of the invention, adapted to be connected to the valve or to a point in the fluid pressure line which is supplied by the valve which, when actuated, initiates the relatively slow feed movement of the slide so as to supply pressure behind the piston 53 only during the time that the feed movement takes place, the pressure being shut off so that the clutch can be disengaged during all other portions of the movement of the slide, including the relatively rapid return movement and the relatively rapid forward movement before the relatively slow feed movement is initiated. Thus with this mechanism the pointer will be moved from its zero position to its proper feed indicating position and will not respond to the fast idle movements of the slide.

It was previously stated that instead of having the movement of the spindle or of the slide transmitted to the corresponding movable member of the indicator by a tachometer, the movement of the movable member of the indicator corresponding to either the spindle or slide or both might be imparted by the control mechanism or by the parts moved thereby. This would have the advantage that the movable indicating member would then assume certain definite positions and would not be subject to any slight oscillatory motion which may exist when the drive is through a tachometer. In Figs. 7, 8, 9 and 10, I have shown a construction wherein this idea is carried out, the arrangement here illustrated being such that the drum carrying the indicia for indicating the R. P. M. of the spindle is positively moved to any one of its different speed indicating positions by mechanism actuated by the control levers which are designed to shift the speed change mechanism so as to impart to the spindle any one of the predetermined permissible speeds. Similarly, I have shown in these figures the pointer or needle operated by mechanism for controlling the slide movements.

In this instance (as is customary with many standard forms of lathes), the speed of the spindle is controlled by three control levers designed to shift speed changing gear cones to permit a multiplicity of speeds, in this instance twelve, to be imparted to the spindle. These control levers may be mounted on a suitable part of the head 11 of the lathe, being shown on the front side of the lathe in Figs. 7 and 8. It may be assumed that they are so mounted although in some instances the levers are mounted on the top of the lathe head or part on top and part on the front side. This phase of my invention can be employed with any of the stated positions of the levers in so far as their mounting on the lathe head is concerned, and it may be employed also regardless of the number of control levers that are utilized, a greater number than the three here illustrated permitting a greater number of definite speeds to be imparted to the spindle, and a smaller number of levers permitting a less number of speeds, in which event there will be a greater or less number of positions of the indicating drum or other movable member carrying the indicia which indicate the R. P. M. of the spindle.

In Fig. 7 the three levers are designated 58ª, 59ª and 60ª, these levers being mounted on shafts 58, 59 and 60. As indicated, the lever 58ª is a three position lever, meaning that it is designed to shift a three-step gear cone, and, as indicated, the levers 59ª and 60ª are two position levers, in which event each is adapted to shift a two-step gear cone. Obviously, by these three levers controlling, respectively, a three-step gear cone and two two-step gear cones, twelve different speeds may be imparted to the spindle by the constant speed power shaft which may be rotated by a motor or a belt driven pulley. With the arrangement indicated, each movement given to each of the three levers and shafts imparts (by means of a member actuated by or moving with the lever) a definite movement to the drum 17 and to the drum actuating shaft 61. The mechanism by which this is accomplished may assume different forms though it is essential to the successful operation thereof that the mechanisms be so designed that the drum will be properly actuated regardless of the particular lever or combinations of levers which may be actuated and regardless of the order in which they may be shifted. The mechanism herein illustrated answers the requirements in these respects very effectively, and, therefore, the principle of this mechanism is preferred, though, of course, many of the details may be varied without affecting the operation.

In this instance, the parts which are shifted by the shafts 58, 59 and 60 are arranged on the inner side of the front face of the lathe in a housing 11ᵇ, as indicated in Figs. 8, 9 and 10. These parts include an arm 62 which moves with shaft 58, an arm 63 which moves with shaft 59, and an arm 64 which moves with shaft 60. Arm 62 is adapted to shift in an endwise direction a non-rotatable rod 65, one end of which has a steep thread 66 engaged by a rotatable sleeve 67 which is adapted to move in an endwise direction a non-rotatable rod 68 which, for a portion of its length, has a steep thread 69 engaged by a rotatable sleeve 70 having for the major portion of its length on the exterior thereof a circular rack 71 engaging a pinion 72 on the lower end of the drum actuating shaft 61. In this instance, rod 68 is squared at one end, and the squared end projects into a squared hole in rod 65.

The movement of arm 62 (due to the movement of lever 58ª) to its three operative positions will shift the rod 65 endwise to three different positions, and this direct endwise movement will impart a similar endwise movement to the sleeve 67, the rod 68 and the sleeve 70, causing the shaft 61 to be accordingly rotated.

The arm 63, movable with the lever 59ª, is adapted to rotate a long faced gear 73, in this instance through the medium of a rack 74 which is connected to the arm 63. The long faced gear 73 engages a pinion 75 on one end of the sleeve 67. When the rod 65 is moved endwise, the gear 75 simply slides along the long faced gear 73, but when the arm 63 is shifted, the rotation of the long faced gear 73 rotates the pinion 75 and on account of the threaded relation between the sleeve 67 and the rod 65 the sleeve will be rotated and also given an endwise movement, this movement, of course, being transmitted to the shaft 61.

In a similar manner the lever 60ª transmits endwise movement to the sleeve 70 for the arm 64 is shown connected to a rack 76 engaging a pinion 77 movable with a long faced gear 78 which engages a gear 79 on sleeve 70. When the levers 58ª and 59ª are actuated and lever 60ª is stationary, gear 79 slides along the teeth of the long faced gear 78, but whenever lever 60ª is actuated, the rotation of the gear 79 and of the sleeve 70, by reason of the threaded engagement of the sleeve with the steep threads 69 of rod 68, will cause the sleeve 70 to be moved endwise as well as rotated, thus rotating shaft 61.

The proportions of the gears and the angles of the threads 66 and 69 on the rods 65 and 68 respectively are such that when the lever 58ª is swung to its different permissible positions the gear 79 will move from position A to position C or to position E (shown above the sleeve 70 of Fig. 9), each movement of this lever imparting to the gear 79 an endwise movement equivalent to what may be termed two spaces. If lever 59ª is moved while lever 58ª is stationary, the gear 79 will be moved from position A to position B or from position C to position D, or from position E to position F, depending upon the position of lever 58ª, each endwise movement imparted to gear 79 being, in this instance, one-half the movement imparted by each movement of the lever 58ª. The gear 79 is, therefore, given a movement equivalent to one space (as indicated in Fig. 9) by the movement of lever 59ª as distinguished from a two-space movement imparted by each movement of lever 58ª.

When the lever 60ª is moved from one operative position to another, the gear 79 is given an endwise movement of six spaces as compared with the two-space movement imparted by the movement of lever 58ª and the one-space movement imparted by the lever 59ª. That is to say, if the gear 79 is in position A before the lever 60ª is shifted, it will be moved to position A', or if in position B, it will be moved to position B' and so forth for the remaining positions C, D, E and F.

It will be observed that each position of the drum 17, indicating a certain speed of the spindle, is dependent upon a certain positioning or arrangement of the levers 58ª, 59ª and 60ª, and it is possible to position the drum in any one of its twelve speed indicating positions by operating the levers 58ª, 59ª and 60ª in the proper combinations or by placing them in a certain predetermined position irrespective of the order in which the levers are moved. That is to say, there is a fixed relation between each speed indicating position of the drum and a definite combination of positions of the three levers.

Obviously, if two levers only were employed for controlling the speed of the spindle, the sleeve 78 and the parts immediately associated with it would be omitted, which would enable six speeds to be imparted to the spindle and would cause the actuation of the drum to any one of these six speed indicating positions by the movement or proper combination of movements of the levers 58ª and 59ª. Likewise, it will be obvious that if more than three speed control levers are employed the particular mechanism herein shown can be extended to accommodate the additional lever or levers by adding to the drum actuating mechanism gears and sleeves similar to the sets of these elements associated with lever 59ª and lever 60ª, it being understood that the addition of one lever for controlling a two-step gear cone would permit twenty-four spindle speeds, and the corresponding extension of the drum actuating mechanism, as explained above, would cause the drum to be shifted to twenty-four speed indicating positions.

In Figs. 7 and 8 I have shown how the pointer 35 of the indicator may be actuated by the mechanism utilized in the control of the rate of movement of the slide. In this instance, the rate of movement of the slide is controlled by a single control member in the form of a knob 80 which is mounted in convenient position at the front of the machine, in this instance being secured to a short shaft 81 extending through the front wall of the bed of the machine directly beneath the head 11. The knob has a pointer 80ª which is adapted to cooperate with the graduations of a scale stationarily mounted about the axis of movement of the knob so as to assist the operator in the control of the slide, giving him a visual indication of the position of the knob in any particular instance. In this instance, the movement of the knob and of the shaft 81 on which it is mounted is transmitted to the control mechanism by an endwise movable rod 82 having rack teeth formed on a portion thereof and engaging a pinion 83 secured to the inner end of the shaft 81. The endwise movable rod 82 may actuate any suitable variable speed slide actuating means. For example, it may operate a sliding key in a suitable gear cone or it may be connected to a valve which controls the rate of flow of an actuating fluid in the event that the slide is hydraulically operated, both means of slide actuation and control being well known in the machine tool art.

With the present arrangement it is only necessary to provide suitable means whereby the movement of the knob 80 is transmitted to the pointer 35 of the indicator, and this can be accomplished in a very simple way by transmitting the movement of shaft 81 to the pointer by rack mechanism. This is shown in Fig. 8 wherein the movement transmitting rack is illustrated at 84, this rack, as shown, being mounted in vertical position and being provided at its lower end with rack teeth engaging a pinion 85 secured to shaft 81 (to which knob 80 is attached) and at its upper end having rack teeth engaging a gear segment 86 which is secured to the pointer 35 or to a spindle carrying it.

Thus, with this mechanism the drum will assume a position, through the medium of the work spindle control mechanism, corresponding to the rate of rotation of the spindle, and the pointer will assume a position through the medium of the control mechanism for the slide corresponding to the rate of movement of the slide. It is to be understood, of course, that the position of the knob controls the rate of movement of the slide during its feeding movement and this is true regardless of whether the knob controls mechanical actuating means such as a gear cone, or the valve utilized with the hydraulic method of slide actuation. It will be understood, further, that with this method of operation of the pointer of the indicator the position of the pointer will not be affected by a high speed return or a high speed forward motion of the slide up to the point where the feeding movement is initiated.

While I have shown, in Figs. 1 to 6, both elements of the indicator tachometer-operated, and, in another embodiment, both elements operated mechanically through the control means, in some instances it may be desirable that one element of the indicator be tachometer-operated and the other be operated through the control means, and, obviously, in such case either element of the indicator may be tachometer-operated and the other operated through the control means.

While I have described my invention as applied to a lathe for indicating the movement of the slide, and, in some instances, the feed movement only of the slide for each revolution of the work spindle of a lathe, I wish it to be understood, as already pointed out, that my improved indicating device may be used to advantage in other types of machines, whether or not of the machine tool class, for indicating the rate of movement of a member, particularly a reciprocating member, and particularly for indicating its rate of movement for each revolution or other movement of another part, especially when the two parts are not in their actuation mechanically connected together but are driven by independent power means or sources of power. I therefore aim in my claims to cover all modifications and all adaptations which do not involve a departure from the spirit and scope of the invention in its broadest aspects.

Having thus described my invention, I claim:

1. An indicator having two movable indicating members operatively associated respectively with two actuated parts of a machine and cooperating with each other to give an indication of the rate of movement of one part with reference to the rate of movement of another part.

2. An indicator comprising two movable indicating members, one bearing indicia and the other in the form of a pointer, and both cooperating to give an indication, said members being operatively associated resectively with two actuated parts of a machine.

3. An indicator having two movable indicating members associated with two actuated members of a machine and operatively related thereto so that by their conjoint movements readings may be taken.

4. The combination with a machine having a plurality of movable members, of an indicator having cooperating indicating elements, and means by which each indicating element assumes a position in accordance with the rate of movement of one of said movable members.

5. The combination with a machine having a plurality of movable members, one rotary, of an indicator having movable indicating elements each operatively associated with one of said movable members of the machine whereby the movement of one member in relation to the movement of another may be read on an indicator.

6. The combination with a machine having a reciprocating member, of an indicator having a movable indicating device operatively associated with said reciprocating member so as to assume a position indicative of its rate of movement.

7. The combination with a machine having a reciprocating member, of an indicator having a movable indicating device operatively associated with said reciprocating member so as to assume a position indicative of its rate of movement while moving in one direction.

8. The combination with a machine having a reciprocating member, of an indicator having a movable indicating element operatively associated with said reciprocating member so as to assume a position indicative of its rate of movement while said member is passing through a portion of its reciprocatory movement.

9. The combination with a machine having a plurality of actuated members including a reciprocatory member, of an indicator having movable indicating elements each associated with one of said members and serving to indicate the rate of movement of one member with reference to the movement of the other.

10. The combination with a machine having a rotary and a reciprocatory member, of an indicator having two movable cooperating indicating devices each operatively associated with one of said members and serving by their conjoint movements to indicate the rate of movement of the reciprocatory member with reference to the rate of rotation of the rotary member.

11. The combination with a machine having a plurality of movable members, of an indicator having movable indicating devices each operatively associated with one of said movable members so as to respond to movements thereof, and at least one being tachometer-operated.

12. The combination with a machine having a rotary member and a reciprocatory member, of an indicating device having two cooperating movable indicating elements which by their conjoint movements give readings and which are operatively associated with said movable members of the machine, at least one of said elements being tachometer-operated.

13. The combination with a machine having a plurality of actuated members, of an indicating device having cooperating movable indicating elements which by their conjoint movements give readings and which are operatively associated with said movable members of the machine, each of said members being tachometer-operated.

14. The combination with a machine having movable actuated members, of an indicator having cooperating movable indicating elements which by their conjoint movements give readings and each being operatively associated with one of said members of the machine so as to respond to movements thereof, and one of said members of the machine having variable speed control means which operates a corresponding element of the indicator.

15. The combination with a machine having movable actuated members, and a series of control members for one of them, of an indicator for indicating the rate of movement of one of said members with relation to the rate of movement of another, and having cooperating movable elements each associated with one of said members and at least one of said elements being actuated by said control members.

16. The combination with a machine having a plurality of actuated members including a reciprocatory member and a plurality of control members for controlling the movement of one of said members of the machine, of an indicator for indicating the rate of movement of one of said members with relation to the rate of movement of another comprising two movable, cooperating indicating elements each associated with one of said members and one being operated by said control members.

17. The combination with a machine having a plurality of actuated members including a multi-speed rotary member, and control members for varying the speed of said rotary member, of an indicator for indicating the rate of movement of one of said members in relation to the rate of movement of the rotary member comprising movable, cooperating indicating elements each associated with one of said members and one operatively connected to said control members so as to assume a position in accordance with the actuation of said members.

18. The combination with a machine having a plurality of movable actuated members and control means for each of said members by which its rate of movement may be varied, of an indicator for indicating the movement of one member with reference to another connected with and operated by the control means of said members.

19. The combination with a machine having a rotary member and a reciprocatory member each having control means by which its rate of movement may be varied, of an indicator for indicating the movement of one member with reference to the movement of the other member, said indicator being connected to and operated by the control means of both members.

20. The combination with a machine having two movable actuated members, of an indicator for indicating the rate of movement of one member with respect to the other, said indicator being operatively associated with and responding to the movements of both members.

21. The combination with a machine having a rotary member and a reciprocatory member, of an indicator for indicating the rate of movement of one member with reference to the movement of the other, said indicator being operatively associated with and responding to the movements of both of said members.

22. The combination with a machine having a movable member, means comprising a plurality of control members for controlling the rate of movement of said member, and a shiftable device which assumes definite predetermined positions in accordance with predetermined rates of movement of said member irrespective of which control members are actuated and the order of their actuation.

23. The combination with a movable member whose rate of movement is to be indicated, and means comprising a plurality of control devices for controlling the rate of movement of said member, of an indicating member, and means for connecting said indicating member to said control devices so that it will assume definite positions in accordance with different rates of movement of said member irrespective of which of said control devices are actuated and the order of their actuation.

24. The combination with a movable member, and means including a plurality of control devices for varying the rate of movement of said member, of an element which assumes definite positions in accordance with definite rates of movement of said member, and means connecting said element to each of said control devices so that each of the latter will independently actuate said element without interfering with independent movements which may be imparted to said element by any of the other control devices.

25. The combination with a machine having a movable member and a control mechanism for said member by which its rate of movement may be varied, of an indicator for indicating the rate of movement of said member and having an indicating member operated by said control mechanism, the position of said indicating member having a fixed relation to the position of the control mechanism in any operative position thereof.

In testimony whereof, I hereunto affix my signature.

JOHN J. N. VAN HAMERSVELD.